United States Patent [19]
Amelio

[11] 3,811,254
[45] May 21, 1974

[54] ENGINE AIR PARTICLE SEPARATOR WITH FLUID SCAVENGE PUMP

[75] Inventor: Armand F. Amelio, Yonkers, N.Y.

[73] Assignee: United Aircraft Corporation, East Hartford, Conn.

[22] Filed: May 8, 1972

[21] Appl. No.: 251,490

[52] U.S. Cl............... 55/306, 55/431, 55/466, 55/468, 60/39.09 P, 417/197
[51] Int. Cl............................................. B01d 45/12
[58] Field of Search ........... 55/306, 431, 468, 466; 60/39.09 P, 39.09 I; 417/197; 244/53 B

[56] References Cited
UNITED STATES PATENTS

| | | | |
|---|---|---|---|
| 1,901,797 | 3/1933 | Black | 417/197 |
| 2,396,290 | 3/1946 | Schwarz | 417/197 |
| 2,600,302 | 6/1952 | Kinsella | 55/306 |
| 3,165,390 | 1/1965 | Parken et al | 55/468 |
| 3,421,296 | 1/1969 | Beurer, Sr. | 55/306 |
| 3,534,548 | 10/1970 | Connors | 55/306 |

*Primary Examiner*—Bernard Nozick
*Attorney, Agent, or Firm*—Vernon F. Hauschild

[57] ABSTRACT

A scavenge pump in the form of tubular member is connected to the bottom wall of the housing of an engine air particle separator and is shaped to define an annular ejector so that as heated fluid is passed through the annular ejector the portion of the scavenge pump nearest the separator is heated by convection to prevent ice formation and the heated air from the ejector is discharged to form a low pressure region in the tubular member and is passed along the inner wall of the tubular member to prevent ice formation thereagainst, thereby permitting the scavenge of liquid and gases, which may be below the freezing temperature in the low pressure region of the separator, to be discharged through said tubular member due to the operation of the scavenge pump.

8 Claims, 5 Drawing Figures

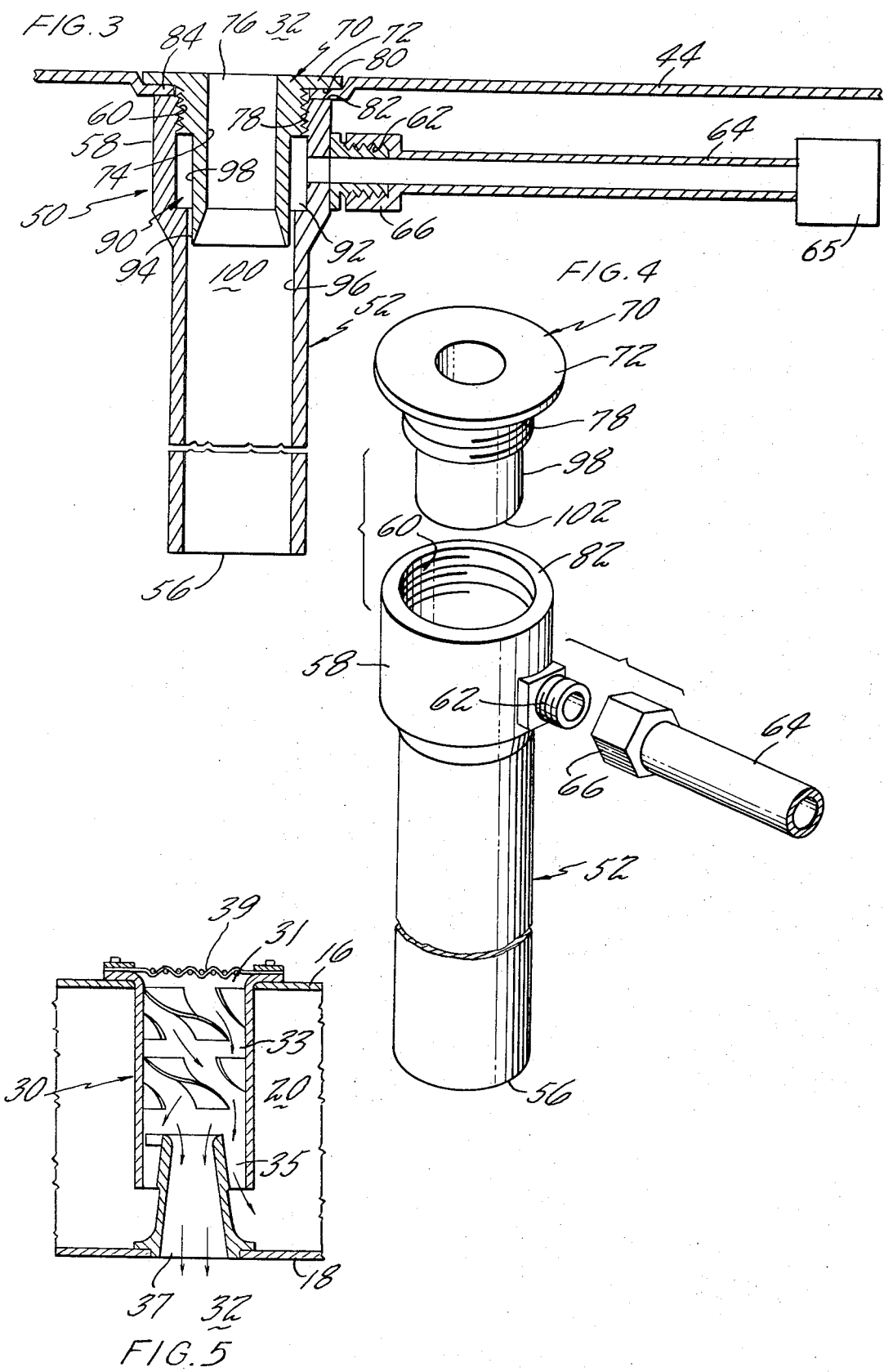

ENGINE AIR PARTICLE SEPARATOR WITH FLUID SCAVENGE PUMP

BACKGROUND OF THE INVENTION

1. Field of the Invention

This invention relates to engine air particle separators and more particularly to such separators which accumulate liquid and gases, such as water, in the low pressure region of the interior thereof due to the engine suction force, which fluid is prone to freeze prior to scavenge therefrom. A scavenge pump is provided for use with such an engine air particle separator which includes a conduit communicating with the low pressure interior of the engine air particle separator housing and includes an annular ejector in the walls thereof adjacent the housing so that as heated fluid, such as engine air, is caused to pass through the annular ejector, a low pressure region is formed in the conduit and the heated fluid will heat the scavenge pump parts adjacent thereto by convection and the circumferential discharge of heated fluid therefrom along the inner walls of the conduit prevents the formation of ice thereagainst.

2. Description of the Prior Art

In the engine air particle separator art, attempts have been made to permit fluid within the engine air particle separator to drain therefrom and to prevent the fluid from freezing therewithin so as to cause malfunction of the engine air particle separator, by passing heated engine air over the engine air particle separator so as to maintain all parts thereof above the freezing temperature of the entrained fluid, however, this has proved expensive, difficult to control and not altogether reliable. Separator units have been anti-iced in the past by providing heat to the bypass doors and air inlet and also the aft floor of the separator. These heated surfaces prevent ice from forming on them and, therefore, there is a certain amount of water run-back. This water accumulates at the low spot in the separator floor and, if not drained overboard, it may freeze and be injected into the engine thereby causing severe damage.

SUMMARY OF THE INVENTION

A primary object of the present invention is to provide an engine air particle separator which has a scavenge pump which permits scavenge of the fluid from the low pressure interior thereof under all operating conditions, including operation in sub-freezing temperatures.

The present invention includes a scavenge pump attached to the bottom wall or sump of the engine air particle separator in which water accumulates. Drainage from the separator interior is made difficult because engine suction establishes a low pressure region therein. The scavenge pump comprises duct means including an annular ejector communicating with the engine air particle separator interior and using ejector action to reduce the pressure in the duct means and thereby cause the fluid to flow from the low pressure engine air particle separator interior to the higher pressure of the atmosphere or the like, and which can be utilized with hot pressurized gas, thereby employing both convection heating and hot air film operation to prevent the formation of ice within the scavenge pump due to the passage of the fluid therethrough.

Other objects and advantages of the present invention may be seen by referring to the following description and claims, read in conjunction with the accompanying drawings.

BRIEF DESCRIPTION OF THE DRAWINGS

FIG. 3 is an enlarged cross-sectional showing through the scavenge pump of the engine air particle separator.

FIG. 4 is an exploded view of the parts of the engine air particle separator scavenge pump.

FIG. 5 is an enlarged cross-sectional showing of a centrifugal separator tube.

DESCRIPTION OF THE PREFERRED EMBODIMENT

Figure 1:
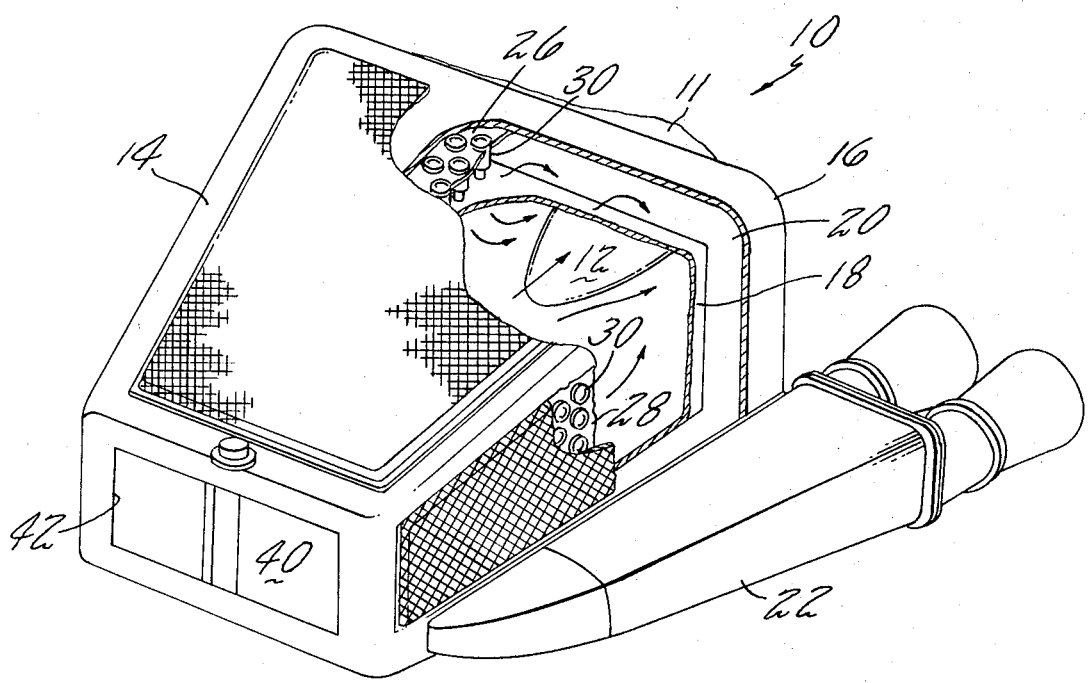
FIG. 1 is a schematic showing, partially broken away, of an engine air particle separator of the type utilized herein.
Figure 2:
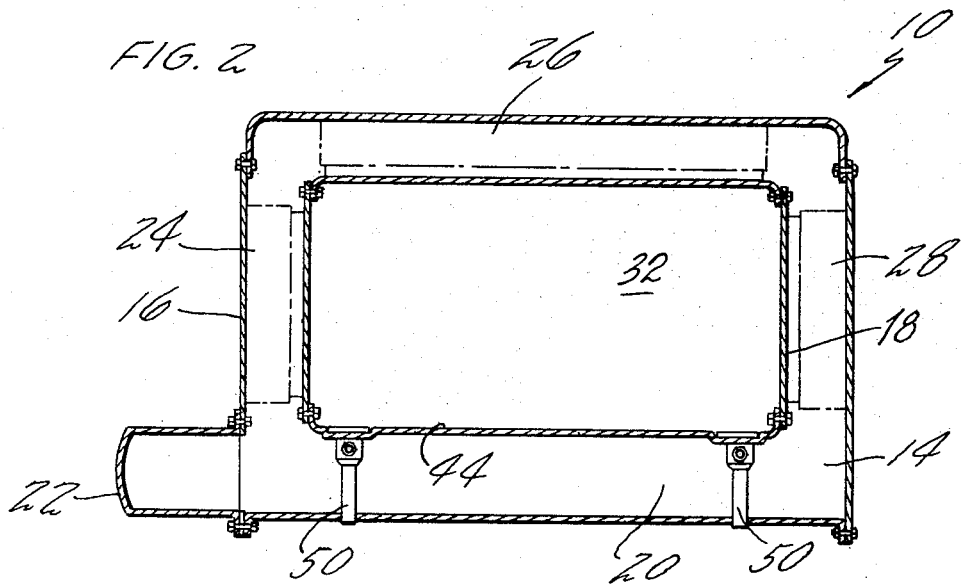
FIG. 2 is a cross-sectional showing through an engine air particle separator illustrating the location of the scavenge pump.

Viewing FIGS. 1 and 2 we see engine air particle separator 10, which is adapted to be connected to the inlet of an engine 11, such as an aircraft jet engine, the inlet nose of which is shown at 12, so that fine foreign particles are removed from the air entering the engine so as to preserve engine parts. Engine air particle separator 10 includes housing 14, which has outer walls 16 and inner walls 18 cooperating to define particles scavenge chamber 20 therebetween. Inner walls 18 define clean air chamber 32 therewithin which communicates with the inlet of engine 11. Appropriate foreign matter particle separators extend between outer walls 16 and inner walls 18 and are fabricated in conventional fashion so that the separated particles enter chamber 20 and are scavenged therefrom by scavenge pump section 22. Preferably, these particle separators comprise banks of individual centrifugal separators, such as banks 24, 26 and 28, each of which includes a plurality of centrifugal separator tubes 30, shown best in FIG. 5. Separator 30 includes inlet 31 communicating with atmosphere, and vaned centrifugal separator section 33 which causes the separated particles to discharge through outlet 35 into chamber 20 and the cleaned air to discharge through outlet 37 into the interior chamber 32 of the separator 10. A coarse screen 39 may cover one or more separator tubes 30. Accordingly, all engine air entering the engine inlet must pass through one of the particle separators 30 of the separator banks 24, 26 or 28, from which the separated particles are scavenged into chamber 20 and discharged overboard through scavenge pump system 22, with the cleaned air entering chamber 32, from which it enters the engine inlet.

Door member 40 is positioned at the forward end of engine air particle separator 10 within inlet opening 42 so that, when engine air particle separation is not required or not necessary, door members 40 may be opened to permit the entry of ram air directly through inlet 42 and through the interior 32 of engine air particle separator 10 into the engine inlet. A single engine air particle separator 10 may service one or more engines and may be of the type shown in greater particularity in U.S. Pat. Nos. 3,421,296 and 3,449,891. Engine 11 may be of the type shown in greater particularity in U.S. Pat. Nos. 2,711,631 and 2,747,367.

Since aircraft must operate in all types of weather conditions, fluid, such as water, becomes entrapped or entrained within chamber 32, and accumulates along the bottom wall 44 thereof in sump fashion. This fluid can be rain water, melted snow, condensed atmospheric moisture, or fluid from any other source. A problem is encountered in draining such entrained fluid from chamber 32 because that chamber is operating at a low pressure due to the suction force at the inlet of the engine 12 which the engine air particle separator 10 is serving. Accordingly, the fluid, if it is to be gravity drained, would be required to flow from a low pressure to a higher pressure region, which is impossible. When the engine air particle separator is operating in a subfreezing atmosphere, the accumulation of this entrained fluid presents a hazard because it will freeze and can be injected by the engine causing great damage, in addition to blocking engine air flow.

It is accordingly my objective to provide a scavenge pump for use with the engine air particle separator which is capable of drawing the fluid from the low pressure chamber 32 and preventing the icing thereof.

My scavenge pump 50 is preferably positioned at the normal low water level area of engine air particle separator 10, and may be in the center and at the engine inlet end of bottom wall 44. In the embodiment shown, two scavenge pump units are used to provide for operation regardless of aircraft attitude. Scavenge pump 50 may drain overboard or may be drained to any other appropriate region.

As best shown in FIGS. 3 and 4, scavenge pump 50 includes a first conduit, duct or pipe member 52 which has a cylindrical section 54 defining the outlet 56 of scavenge pump 50 and which has an enlarged end 58 having female threads 60 on the inner wall thereof, and also has a threaded connection 62, to receive hot, pressurized air conduit 64 in threaded engagement due to the action of nut member 66. Scavenge pump 50 further includes nut member 70 having a cap end 72 and a hollow interior 74 defining the inlet 76 of pump 50. Nut 70 has male threads 78, which cooperate with female threads 60 of tube member 52 so as to serve to clamp around the aperture defining portion 84 of bottom wall 44 so as to connect pump 50 to the bottom wall 44 of engine air particle separator 10. Nut 70 and tube member 52 are shaped so as to define annular ejector 90 therebetween when in their FIG. 3 positions. Annular ejector 90 includes annular chamber 92 positioned between nut 70 and the enlarged end 58 of member 52 adjacent wall 44 and chamber 32 and also includes the circumferential discharge slot 94, which is defined between the inner wall 96 of member 52 and wall 98 of nut 70 with pump 50 assembled as shown in FIG. 3. When heated pressurized fluid passes through conduit 64 and into annular chamber 92 for discharge therefrom through circumferential, annular ejector slot 94, ejector 90 serves to form a low pressure region within the hollow interior 100 thereof so as to draw the fluid from chamber 32 therethrough for scavenge through outlet 56 thereof. The heated fluid passing through duct 64 may be from any source 65 but is preferably heated air from the engine 11, such as engine compressor air. Nut 70 is made of a material which conducts heat readily, such as aluminum, and therefore the heat imparted thereto by the hot fluid passing through annular ejector 90 heats the nut through convection so as to prevent icing of the entrained fluid therewithin. It will also be noted that the circumferential discharge of the heated fluid from circumferential discharge slot 94 of ejector 90 causes heated fluid to flow along the inner walls 96 of member 52, not only heating those walls but causing the entrained fluid to flow through the interior of member 52 so as to prevent ice formation against surface 96.

It will therefore be seen that scavenge pump 50 serves to create a low pressure region within the interior 100 thereof so as to cause the fluid within engine air particle separator interior chamber 32 to flow therethrough due to ejector action, and also utilizes both convection heating and heated film flow to prevent ice formation in scavenge pump 50. Nut 70 is preferably tapered as shown at its downstream or outer end 102 so as to minimize flim dispatch and obtain a high energy exchange. In addition, a modification of the pump unit may be utilized for high efficiency wherein the chamber 90 formed by nut 70 is eccentric and will provide a greater volume at the side where hot air is introduced.

I wish it to be understood that I do not desire to be limited to the exact details of construction shown and described, for obvious modifications will occur to a person skilled in the art.

I claim:

1. An air filter adapted to be attached to the inlet of an air breathing engine and including:
    A. an inner wall member shaped to define a passageway therewithin having an inlet opening and an outlet opening adapted to be connected to an air breathing engine inlet in axial alignment,
    B. an outer wall member communicating with atmosphere and enveloping said inner wall member and spaced therefrom to define a chamber therebetween,
    C. a plurality of centrifugal separator tube members each extending between and through said wall members and having an inlet connected to said outer wall to communicate with atmosphere external of said outer wall member and also having a clean air outlet connected to said inner wall and communicating with said passageway within said inner wall member and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said passageway,
    D. means connecting said wall members to said separator tube members and to each other so that the only gas flow paths between said wall members is through said separator tube members,
    E. scavenge means connected to said chamber and applying a suction thereto to scavenge the separated material therefrom,
    F. and door means positioned in said inlet opening of said inner wall member and mounted and shaped to be movable between a first position to block air flow into said passageway so that all air entering said passageway must pass through said centrifugal separator tube members and a second position to permit air flow through said inlet opening and into said passageway,
    G. a fluid scavenge pump comprising:

1. tube means mounted in the bottom of said inner wall member and having an inlet opening into the inner wall member interior and oriented to constitute a drain therefrom and having an outlet and including:
   a. annular ejector defining means near the inlet of said tube means shaped to define an annular passage around said tube means and an annular ejector outlet therefrom oriented to discharge along the inner wall of said tube means toward the outlet end thereof so that fluid passed through said annular ejector defining means will create a suction to cause accumulated fluid to scavenge from said housing and through said tube means.

2. An air filter adapted to be attached to the inlet of an air breathing engine and including:
   A. an inner wall member shaped to define a passageway therewithin having an outlet opening adapted to be connected to an air breathing engine inlet in axial alignment,
   B. an outer wall member communicating with atmosphere and enveloping said inner wall member and spaced therefrom to define a chamber therebetween,
   C. a plurality of centrifugal separator tube members each extending between and through said wall members and having an inlet connected to said outer wall to communicate with atmosphere external of said outer wall member and also having a clean air outlet connected to said inner wall and communicating with said passageway within said inner wall member and further having a separated particle outlet into said chamber, and still further having means to apply centrifugal force to the atmospheric air between said inlet and said separated particle outlet so that material separated from the atmospheric air in passing through said centrifugal force applying means will enter said chamber and clean air will enter said passageway,
   D. means connecting said wall members to said separator tube members and to each other so that the only gas flow paths between said wall members is through said separator tube members,
   E. scavenge means connected to said chamber and applying a suction thereto to scavenge the separated material therefrom,
   F. a fluid scavenge pump comprising:
      1. tube means mounted in the bottom of said inner wall member and having an inlet opening into the inner wall member interior and oriented to constitute a drain therefrom and having an outlet and including:
         a. annular ejector defining means near the inlet of said tube means shaped to define an annular passage around said tube means and an annular ejector outlet therefrom oriented to discharge along the inner wall of said tube means toward the outlet and thereof so that fluid passed through said annular ejector defining means will create a suction to cause accumulated fluid to scavenge from said housing and through said tube means.

3. An engine air particle separator according to claim 2 wherein said tube means adjacent said bottom of said inner wall member is made of a material of high heat conductivity so that as heated fluid passes through said annular ejector defining means said tube means portion will be heated thereby to prevent ice formation thereagainst and so that the discharge of heated fluid from said annular ejector outlet along the inner walls of said tube means will prevent ice formation thereagainst.

4. A separator according to claim 2 wherein said annular passage is eccentric with respect to the tube means.

5. An engine inlet air particle separator comprising a closed box-like container defining a first ductway therewithin and said container having at least three sides which are formed of inner and outer spaced walls forming a second ductway therebetween, a plurality of centrifugal separator tube members each extending between and through said walls and having an inlet connected to said outer wall to communicate with atmosphere external of said outer wall member and also having a clean air outlet connected to said inner wall and communicating with said first ductway within said inner wall member and further having a separated particle outlet into said second ductway, and still further having means to apply centrifugal force to the atmospheric air between said inlet and said separated particle outlet so that material separated from the atmospheric air in passing through said centrifugal force applying means will enter said second ductway and clean air will enter said first ductway, means connecting said walls to said separator ductway, means connecting said walls to said separator tube members and to each other so that the only gas flow paths between said wall is through said separator tube members, suction means communicating with said second ductway and exhausting exterior to said container to remove separated particles from said second ductway, said container having a first opening at one end adjacent to and substantially equal in area to said engine air inlet and a second opening at the other end away from the engine air inlet, means sealing between said container first opening and said engine air inlet, bypass door means located in said second opening, and means to open said bypass door means to permit air to enter said engine air inlet through said second opening and said first ductway, and a fluid scavenge pump comprising tube means mounted in the bottom of the inner wall and having an inlet opening into said first ductway interior and oriented to constitute a drain therefrom and having an outlet and including annular ejector defining means near the inlet of said tube means shaped to define an annular passage around said tube means and an annular ejector outlet therefrom oriented to discharge along the inner wall of said tube means toward the outlet end thereof so that fluid passed through said annular ejector defining means will create a suction to cause accumulated fluid to scavenge from said first ductway and through said tube means.

6. An engine air particle separator adapted to be connected to an inlet of an engine and having:
   A. wall means shaped to define a first chamber including means adapted to communicate with the engine inlet and a second chamber separated therefrom and including:
      1. a bottom wall section defining what is normally the bottom of said first chamber and against which fluid in the first chamber will accumulate,
   B. at least one particle separator member supported in said wall means and communicating with said chambers so that air entering the engine must pass therethrough for particle separation, and shaped to discharge separated particles into said second chamber and the air with particles so separated therefrom into said first chamber, C. means to scavenge separated particulate from said second chamber, and D. a fluid scavenge pump comprising:
  1. tube means mounted in said bottom wall section and having an inlet opening into said first chamber and oriented to constitute a drain therefrom and having an outlet and including:
    a. annular ejector defining means near the inlet of said tube means shaped to define an annular chamber within said tube means and further shaped to define an annular ejector outlet therefrom oriented toward said tube means outlet, and through said annular chamber and ejector outlet to thereby create a suction in said tube means to cause accumulated fluid to scavenge from said first chamber and through said tube means.

7. An engine air particle separator according to claim 6 wherein said tube means adjacent said bottom wall section is made of a material of high heat conductivity so that as heated fluid passes through said annular ejector defining means said tube means portion will be heated thereby to prevent ice formation thereagainst and so that the discharge of heated fluid from said annular ejector outlet along the inner walls of said tube means will prevent ice formation thereagainst.

8. An engine air particle separator according to claim 6 wherein said bottom wall section has an aperture therein and wherein said tube means includes:

A. a first tube member having a hollow shank and an enlarged end with female threads adjacent said bottom wall section, B. a nut member having a hollow bore, a cap end, and a male threaded portion sized to cooperate with the female threads of the first tube member so that as the two members are threaded together, the enlarged end of the first member and the cap of the nut clamp onto the walls of the aperture in said lower wall section, and further including a skirt section shaped to cooperate with said flared portion of said first tube member to define the annular ejector therebetween.

* * * * *